April 29, 1947.　　　E. J. POITRAS ET AL　　　2,419,792
HYDRAULIC POWER SYSTEM
Filed June 6, 1935　　　3 Sheets-Sheet 1

INVENTORS
Edward J. Poitras
James D. Tear
BY
Victor D. Borst
THEIR ATTORNEY

April 29, 1947.                E. J. POITRAS ET AL                2,419,792
                                HYDRAULIC POWER SYSTEM
                              Filed June 6, 1935            3 Sheets-Sheet 2

Fig.2

H.P. ―――
EXH. ―――
L.P. ×××××
M₁  ×××××
M₂  ×××××

INVENTORS
Edward J. Poitras
James D. Tear
BY
Victor D. Borst
THEIR ATTORNEY

April 29, 1947.   E. J. POITRAS ET AL   2,419,792
HYDRAULIC POWER SYSTEM
Filed June 6, 1935   3 Sheets-Sheet 3

INVENTORS
Edward J. Poitras
James D. Tear
BY
Victor D. Borst
THEIR ATTORNEY

Patented Apr. 29, 1947

2,419,792

UNITED STATES PATENT OFFICE 2,419,792

HYDRAULIC POWER SYSTEM

Edward J. Poitras, Jackson Heights, and James D. Tear, Great Neck, N. Y., assignors to Ford Instrument Company, Inc., Long Island City, N. Y., a corporation of New York Application June 6, 1935, Serial No. 25,208

22 Claims. (Cl. 60—53)

The invention herein disclosed relates to hydraulically operated systems and in particular to controls for regulating the flow of the hydraulic medium and the operation of hydraulically operated devices.

Although the invention is not limited to any particular application, it has, in some respects, especial utility in a hydraulic system utilizing a hydraulic motor. Heretofore, it has been the common practice to control a hydraulic motor by regulating a valve through which the liquid flowed to the motor. However, the rate of flow of liquid through an orifice, such for example, as a valve, is dependent upon the pressure drop across the valve as well as the valve opening. A valve alone does not, therefore, provide a satisfactory device for regulating the speed of a hydraulic motor as the pressure drop across the valve will vary with variations in the reaction torque on the motor, and the speed of a hydraulic motor of the positive displacement type is dependent upon the rate of flow of fluid through the motor.

By this invention, control of the rate of flow of a hydraulic medium and the speed of a hydraulic motor of the positive displacement type is effected by controlling both the area of an orifice through which the liquid passes and the pressure drop across the orifice. By maintaining one of these factors, upon which the rate of flow of liquid depends, constant, the speed of the motor may be controlled by a single operating element affecting the other factor. It is not material which of the two factors is maintained constant although it has been found preferable to provide a valve, for varying the area of an orifice through which the liquid flows, and to maintain the pressure drop across the valve constant. With such an arrangement, the speed of a hydraulic motor of the positive displacement type may be regulated by movement of a single control element.

In accordance with the invention, the pressure drop across the valve is maintained constant by varying the pressure of the supply. The pressure drop across the valve is in this way maintained constant irrespective of the load on the motor and the speed of the motor is, therefore, independent of the load and varies proportionally to the opening of the valve. Such a system is illustrated in the accompanying drawings in which:

Essentially, the system includes a source of liquid under pressure which is represented by a pump 1, a controller 2 and a hydraulic motor 3, the controller being interposed between the pump 1 and the hydraulic motor 3. In the system illustrated, the pump 1 is of the constant displacement type which supplies a constant volume of liquid per unit of time and it is directly connected to an electric motor 4 by means of which it is driven at a constant speed. The pump supplies a hydraulic medium, preferably oil, for the operation of the hydraulic motor. Since the system illustrated is one for controlling the velocity, both speed and direction, of the hydraulic motor, both the intake and output sides of the pump are connected respectively by conduits 5 and 6 to the controller. Likewise, both passages to the hydraulic motor are connected by conduits 7 and 8 to the controller.

The controller 2 is a valve block forming a housing for, and including interconnecting ports and passages between an overflow or relief valve 9, a reducing valve 10, a pressure regulating valve 11, a four-way control valve 12, a hydraulic amplifier actuated by a pilot valve 13 through which the four-way valve 12 is operated and an advancing or synchronous valve 14. The overflow valve 9 is utilized as a safety valve for the purpose of relieving exessive pressures which may develop under certain conditions of operation. In the system illustrated the pump 1 is capable of supplying oil at a pressure of approximately 1000 pounds per square inch, hereinafter called the high pressure, and in the event that the pressure in the supply line materially exceeds this value, the relief valve connects the supply line to the exhaust. The reducing valve provides a supply of oil at low pressure, approximately 100 pounds per square inch, which oil is used in the actuation of the pressure regulating valve 11 and the amplifier for operating the four-way control valve. The pressure regulating valve maintains the drop in pressure across the oil supply opening, through the four-way valve to the motor, constant at approximately 100 pounds per square inch. This pressure drop is maintained across the supply passage through the valve irrespective of which one of the two motor leads is connected to the supply by the four-way valve which controls the direction of the flow of the fluid delivered to the motor as well as the rate of flow of the liquid. The four-way valve is of the piston type and is provided with ports and passages so arranged that either motor lead may be connected to the high pressure and the direction as well as the speed of the hydraulic motor thus controlled. This four-way valve is hydraulically operated through an arrangement which is termed a hydraulic amplifier. The operation of the four-way valve is controlled by the pilot valve 13 which responds to a very slight force.

Figure 2:
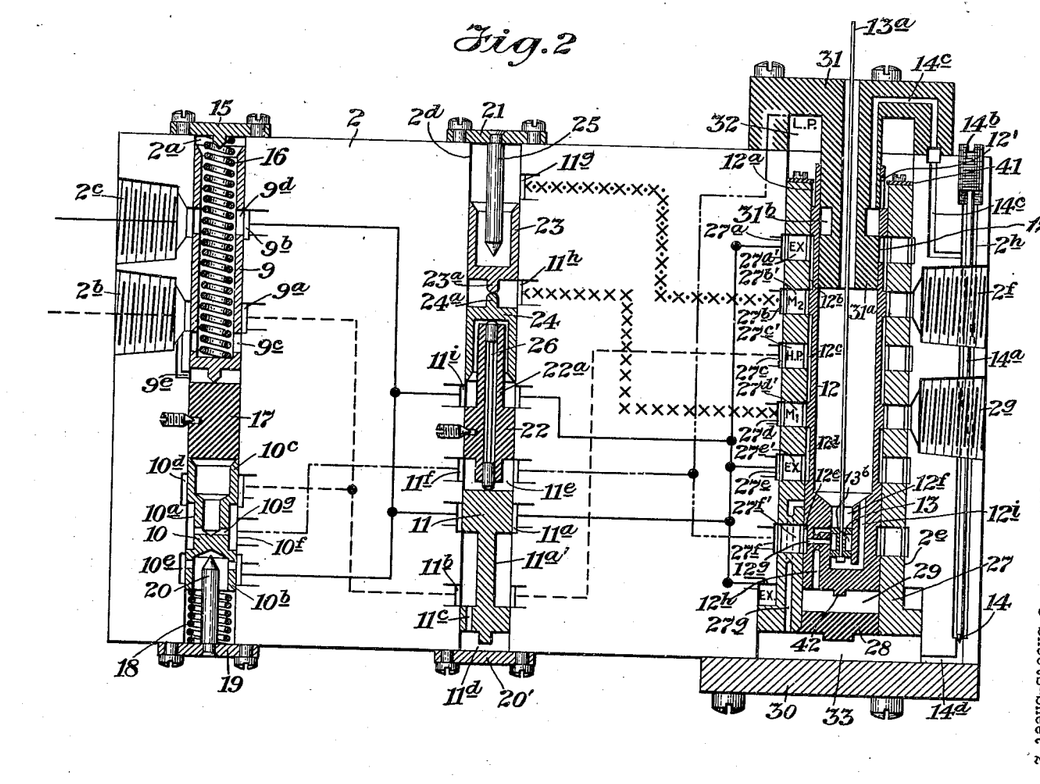
Fig. 2 is a sectional elevation, partly diagrammatic, of the controller.

The overflow valve 9 is fundamentally of a well known type in which the force of the pressure of the oil supply is exerted against a calibrated spring. The valve consists of an elongated cup-shaped member which is received in a bore 2a in the valve block 2 which bore forms a valve chamber. Surrounding the bore and spaced longitudinally thereof, there are two circumferential ports 9a and 9b. These ports communicate with pipe taps 2b and 2c to which the conduits 6 and 5 are respectively connected. A plate 15 closes the end of the bore in which the valve 9 is mounted and provides an abutment against which one end of a calibrated spring 16 abuts. The other end of the calibrated spring 16 abuts against the inner end of the cup-shaped valve 9 and acts to move the valve longitudinally of the bore, away from the plate 15. The valve 9 includes two sets of openings, 9c and 9d, through the cylindrical part thereof. The several circumferentially spaced openings 9c cooperate with the port 9a. The several circumferentially spaced openings 9d are spaced from the openings 9c longitudinally of the valve and cooperate with the port 9b. A port 9e communicates with the space between the inner end of the valve 9 and one end of a block 17 secured in and dividing the bore 2a which extends through the valve block 2. The port 9e also communicates with the high pressure port 9a so that the force exerted by the high pressure oil against the end of the valve is exerted against the force exerted by the spring 16. If the pressure in the port 9a increases beyond a certain predetermined value, the valve 9 is moved against the action of the spring, upwardly as seen in Figure 2, and the openings 9c communicate with the port 9a. The result is that oil flows from the port 9a into the interior of the valve 9 and along the valve, through the openings 9d and to the exhaust port 9b, thus reducing the pressure in the port 9a. When the pressure in the port 9a drops to the predetermined value, the valve 9 moves in the opposite direction to the position in which it is shown in Figure 2 in which position the port 9a is lapped. The force exerted by the oil from the pump thus acts against the spring 16 and moves the valve to relieve excess pressures in the supply line.

The bore 2a also forms a valve chamber for the reducing valve 10. This valve is located on the opposite side of the block 17 to that on which the valve 9 is located. The reducing valve is so arranged that there is a balancing of forces exerted by the oil pressure and a calibrated spring so that the valve opens to the high pressure when the pressure in the low pressure port is less than a certain value, closes when the pressure in the low pressure port reaches the assigned value and opens to the exhaust when the pressure exceeds this value. The valve 10 is of the balanced type of piston valve, having a reduced central portion 10a and two end portions 10b and 10c of larger diameter which cover and uncover the high pressure and exhaust ports. A circumferential high pressure port 10d is formed in the block 2 at a position to cooperate with the enlarged section 10c of the reducing valve. A similar circumferential exhaust port 10e is also provided and located so as to cooperate with the enlarged section 10b of the valve. A low pressure port 10f communicates with the valve chamber between the high pressure and exhaust ports. The end of the valve adjacent the block 17, the upper end of the valve as seen in Fig. 2, is hollow and communicates with the chamber formed by the reduced portion of the valve through a diametral passage 10g so that the oil at the low pressure has access to the interior of the valve. The pressure of the oil acting between the end surface of the block 17 and the surfaces formed on the interior of the valve tend to move the valve away from the block 17, downwardly as illustrated in Fig. 2, and, thus, close the high pressure port and open the exhaust port. The force exerted by this oil under pressure is resisted by a spring 18 which acts between a plate 19, secured over the opening to the bore 2a, and the end of the valve. An abutment pin 20 extending from the plate 19 and into the valve limits the extent the valve may move in the direction of the plate 19. It will be seen that when the pressure in the low pressure port exceeds a value represented by the calibrated spring 18, the valve is moved so as to cut off the high pressure port and open the low pressure port to exhaust. If on the other hand the oil in the low pressure port is below the value represented by the spring 18 the valve is moved in the opposite direction, upwardly as seen in Figure 2, so that the exhaust port is closed and the high pressure port is placed into communication with the low pressure port. The valve thus maintains a supply of low pressure oil at a constant pressure of approximately 100 pounds per square inch.

The pressure regulating valve 11 is also operated by opposing forces, the force exerted by the oil in the high pressure passage acting to move the valve in one direction and the sum of a constant force and the pressure exerted by the pressure of oil in one or the other of the motor leads or passages, the oil of higher pressure being selected, acting to move the valve in the opposite direction. The valve 11 is of the balanced piston valve type having a reduced central portion 11a'. It is slidably mounted in a bore 2d, adjacent one end of the bore, which extends transversely of the block and parallel to the bore 2a. One end of the bore 2d, the lower end as seen in Figure 2, is closed by a plate 20' and the other end is closed by a plate 21. Intermediate the ends of the bore, there is a stationary block 22 forming a partition between the valve 11 and the operating mechanism therefor. In the portion of the bore 2d forming the chamber for the valve 11, there is formed a circumferential exhaust port 11a which is in communication with the exhaust port 9b. Spaced longitudinally of the valve from the exhaust port 11a, there is a circumferential pressure port 11b which is connected to the high pressure port 9a of the valve 9. Through the lower end of the valve 11, there is provided a passage 11c which places the chamber formed by the reduced portion of the valve in communication with a chamber 11d formed between the end of the valve and the plate 20'. It will be observed that the port 11b communicates with the chamber formed by the reduced portion of the valve 11 and through the passage 11c with the chamber 11d. The oil in the chamber 11d tends to move the valve away from the plate 20' and place the ports 11b and 11a into communication so that oil flowing through the port 11b will pass to the exhaust 11a, thus reducing the pressure of the oil in the port 11b and the passages communicating therewith.

This tendency of the valve 11 to move in the direction of the block 22 is resisted by the low pressure oil in a chamber 11e between the block 22 and the end of the valve 11. The chamber 11e is connected to the low pressure port 10f of the valve 10 through a port 11f. In addition to the force exerted by the low pressure oil on the valve 11, the pressure exerted by the oil in the chamber 11d is resisted by the force of the oil in one or the other of ports 11g or 11h which communicate with the bore 2d on the side of the block 22 opposite to that on which the valve 11 is located. Within the upper section of the bore 2d there are fitted two pistons or plungers 23 and 24. Each of these pistons is of cup-shape, the closed ends thereof facing each other. On the adjacent ends of the pistons 23 and 24 there are formed lugs 23a and 24a which abut against each other when there is no pressure in the port 11h or the pressure of oil in the port 11h is less than the pressure in the port 11g. The port 11h normally communicates with the bore 2d between the plungers 23 and 24. The port 11g communicates with the bore 2d on the opposite side of the plunger 23 to that side on which the port 11h communicates. The plate 21 carries an abutment pin 25 which limits the movement of the plunger 23 in a direction away from the plunger 24. The block 22 has a reduced extension 22a which extends into the hollow piston 24 and forms a limiting abutment for this piston. Extending through an axial bore in the block 22, there is a rod 26 which abuts at one end against the piston 24 and at the other end against the end of the valve 11. The chamber formed between the piston 24 and the block 22 is placed into communication with the exhaust so that any leakage passes to the exhaust. The exhaust communicates with this chamber through a port 11i.

With the arrangement illustrated it will be observed that if the pressure in the port 11h is greater than the pressure in the port 11g, the plunger 23 will be forced against the end of the abutment pin 25 and a force will be exerted on the plunger 24 which is equal to the area of the surface of the plunger 24 times the pressure in pounds per square inch. This force will be exerted through the rod 26 on to the valve 11. On the other hand if the pressure in the port 11g is greater than the pressure in the port 11h, the oil entering the port 11g will cause the plunger 23 to abut against the plunger 24 and the force exerted by the oil passing through the port 11g will be transmitted through the plunger 24 and the pin 26 to the valve 11. With this condition existing, the oil passing through the port 11h will have no effect as it will be balanced between the plungers. It will thus be observed that in addition to the pressure exerted by the low pressure oil in the chamber 11e, there will be exerted on the valve 11 a force which is created by the pressure of oil in the port 11g or 11h, depending upon which of the two is of the higher pressure. In other words, the plunger arrangement together with the rod 26 forms a means by which the greater of the two pressures may be selected and added to a constant pressure to resist the movement of the valve under the action of the oil pressure in the chamber 11d. It is also to be noted that the oil pressure in the port 11b will be equal to the pressure in either of the ports 11g or 11h, depending upon which has the oil of higher pressure, plus the force exerted by the low pressure oil which is approximately 100 pounds per square inch. There is thus always maintained a constant drop in pressure of 100 pounds per square inch between the oil in the port 11b and the passage connected thereto and either of the ports 11g or 11h and the passage connected thereto.

The port 11b of the pressure regulating valve is connected to a high pressure port in the four-way control valve which controls communication between this high pressure oil passage and the motor. The four-way valve 12 is an elongated cup-shaped element of circular cross section. It is slidably mounted in a cylindrical sleeve 27. The cylindrical sleeve 27 is slidably mounted in a bore 2e extending transversely of the control block and parallel to the bores 2a and 2d. Ports 27a, 27b, 27c, 27d, 27e and 27f are formed in the wall of the bore 2e. Each of these ports is a circumferential port formed by recessing the wall of the bore 2e. The ports 27a, 27b, 27c, 27d, 27e and 27f cooperate respectively with openings 27a', 27b', 27c', 27d', 27e' and 27f' through the valve sleeve 27. The valve sleeve 27 has a circumferential recess formed in its outer wall for each of these series of openings through the valve sleeve. For the openings 27a' to 27e', there are also formed circumferential recesses in the inner surface of the valve sleeve 27. The ports 27a and 27e are exhaust ports and the inner circumferential recesses are provided so that a very minute opening of these ports is equivalent to a full opening of the ports 27d and 27b which are motor ports. An end plate 28 closes one end, the lower end as seen in Figure 2, of the valve sleeve 27 and there is formed between the end plate 28 and the adjacent end of the valve 12 a chamber 29. A plate 30 closes the lower end of the bore 2e and a cap 31 on the upper end of the valve block closes the upper end of the bore 2e. The cap 31 has a central axial extension 31a which extends into the valve 12 and a chamber 32 is formed in part in the cap and in part in the bore 2e into which chamber the end of the valve 12 and the end of the sleeve 27 extend. As indicated by the different types of lines, the ports 27a and 27e are connected to the exhaust. The ports 27b and 27d are connected to the ports 11g and 11h respectively and also the tapped passages 2f and 2g which are respectively connected to the motor leads 7 and 8. The port 27c is connected to the high pressure, that is, the port 11b of the pressure regulating valve. The arrangement of passages and the interconnection of the ports is indicated by the different lines and the nature of the passages represented by these different lines is indicated in the legend on the sheet of drawings containing Figure 2. In this legend the following abbreviations are used:

HP for High Pressure.
EXH for Exhaust.
LP for Low Pressure.
M for Motor Passage.

The valve 12 has grooves 12a, 12b, 12c, 12d and 12e forming passages extending longitudinally of the valve. These grooves are provided for spanning the various ports and openings through the sleeve 27. It will be observed from Figure 2, that when the valve 12 is moved up relative to the sleeve 27, the port 27d is placed into communication with the exhaust port 27e through the passage formed by the groove 12d in the valve. Also the port 27c is placed into communication with the port 27b. Thus, the high pressure oil flows from the port 27c to the port 27b and from thence to the motor and also to the port 11g. On the other hand, oil exhausted from the motor may pass through the port 27d and to the exhaust port 27e. Likewise, the port 11h is connected to the exhaust. The pressure regulating valve is thus regulated in accordance with the pressure in the port 11g as previously explained. When the valve 12 is moved in the opposite direction with respect to the valve sleeve 27, the high pressure port 27c is placed into communication with the motor port 27d and the motor port 27b is placed into communication with the exhaust port 27a. Under these conditions, the oil is delivered through the motor in a direction opposite to that in which it was delivered when the valve was moved in the other direction and the pressure of the oil in the port 11h predominates over that in the port 11g, and the regulating valve 11 is actuated in accordance with the pressure in the port 11h.

The hydraulic amplifier is used so that relative movement between the sleeve 27 and the valve 12 may be effected by a minimum of effort. Relative movement of the sleeve 27 and the valve 12 is effected by controlling the flow of low pressure oil to and from the chamber 29. This control is effected through the pilot valve 13 which is operated through a valve rod 13a that extends through the center of the valve 12 and the extension 31a of the cap 31. The valve 13 is a balanced piston valve having a central reduced portion 13b and it is mounted in a valve chamber 12f formed in the valve 12. A passage 12g, extending transversely of the valve 12, connects the valve port 12e and the valve chamber 12f at the reduced portion of the valve 13. In the normal position, as seen in Figure 2, the valve 13 laps the end of a passage 12h which connects the valve chamber 12f to the chamber 29. An exhaust passage 12i runs parallel to the valve chamber 12f and connects the end of that chamber with the hollow section of the valve 12. It will be seen that when the valve 13 is moved upwardly as seen in Figure 2, the reduced central portion will span the passages 12g and 12h and oil at the low pressure will enter through the port 27f through the passages 12g and 12h and into the chamber 29 wherein it will exert a force tending to move the valve 12 within the sleeve 27 in the same direction as the valve 13, that is, upwardly. The low pressure is also connected to the chamber 32 and acts on the end of the valve 12 which extends into this chamber. The area of the lower face of the valve 12 is much greater than the area of the end of the valve projecting into the chamber 32. Therefore, when the low pressure oil is admitted to chamber 29, the valve is moved against the oil pressure in chamber 32.

However, when the chamber 29 is connected to the exhaust, the oil pressure in chamber 32 forces the valve down. Therefore, when the valve 13 is moved downwardly in the valve chamber 12f, and the passage 12h is placed into communication with the hollow section of the valve 12 so that the oil in the chamber 29 may be exhausted, the small quantity of oil from that chamber trickling out through the passage through the extension 31 through which the valve rod 13a extends, the pressure of the oil in the chamber 32 causes the valve 12 to move downwardly.

The operation of the system in so far as it has been described is as follows: In the position of the parts of the controller illustrated in Figure 2, the ports 27b and 27d are lapped by the valve 12, the motor is cut off from the supply of oil and it is at rest. If it be desired to effect the operation of the motor, the valve rod 13a is moved, up or down depending upon the direction which it is desired to have the motor operate. Let us assume that the valve rod 13a is moved upwardly so that the reduced section 13b of the valve spans the passages 12g and 12h. Low pressure oil is then admitted through the passage 12g and the passage 12h to the chamber 29. The pressure on the oil in the chamber 29 causes the valve 12 to move upwardly. When this relative movement occurs, the reduced section 12c of the valve 12 spans the high pressure port and the motor port 27b which are placed in communication. Oil under the high pressure is thus admitted to the port 27b and through the tapped passage 2f and the conduit 7 to the motor. The high pressure oil port is also placed in communication with the port 11g and the chamber behind the plunger 23. The pressure of this oil is, therefore, added to the pressure of the low pressure oil to move the valve 11 against the oil pressure in the chamber 11d thus regulating the pressure in the port 11b and the high pressure port 27c of the four-way control valve in accordance with the pressure of the oil acting on the motor. If the load on the motor is heavy, the pressure in the port 27b and motor passage will build up, but at all times the pressure in the port 27c will be 100 pounds per square inch higher than the pressure in the passage 27b due to the addition of the low pressure of 100 pounds per square inch acting upon the valve 11 in conjunction with the pressure in the chamber behind the piston 23. There will, therefore, be a drop in pressure across the valve of 100 pounds per square inch and the rate of flow of oil through the valve and to the motor will be proportional to the port opening.

If it be assumed that the valve rod 13a was moved a certain definite amount, it will be seen that the valve 12 will follow the movement of the valve 13 until the passage 12h is closed. The valve 12 moves the same amount as the valve 13 and the port opening is proportional to the movement of the valve rod 13a. Under these circumstances, the rate of flow of oil to the motor will be constant and proportional to the movement of the valve rod 13a. Therefore, the speed of the motor will also be proportional to the movement of the valve rod 13a.

Let us now assume that the motor is in operation due to the movement of the valve as described above. If the motor is operating at a constant speed due to the valve 13 being held a definite amount out of its neutral or off position with respect to the valve block 2, the relation of the valve 13 and the valve 12 will be the same as illustrated in Figure 2. If the valve 13 is now returned to its original position, it first moves relative to the valve 12, and, consequently, places the passage 12h in communication with the interior of the valve 12 and thus to the atmosphere. The pressure in the chamber 29 is reduced and the pressure on the upper end of the valve 12 due to the oil under pressure in the chamber 32 causes the valve 12 to move downwardly following the valve 13. If the valve 13 has been moved an amount to return it to the neutral position with respect to the control block, as shown in Figure 2, the parts will assume the positions as they are shown in Figure 2 and the motor will be cut off. If, however, the valve 13 is moved downwardly beyond its neutral position with respect to the valve block, the valve 12 following the valve 13 under the circumstances just mentioned will cause the reduced section 12c of the valve 12 to span the ports 27c and 27d. Thus, the oil under high pressure will be admitted to the motor passage 2g and conduit 8 and also to the port 11h and the chamber between the plungers 23 and 24, the port 11h being connected to the port 27d as previously described. Likewise, the port 27b will be placed in communication with the exhaust port 27a since the section 12b of the valve will span these ports. Thus, the side of the motor represented by the motor lead 2g will be connected to the high pressure and the motor lead represented by the tapped passage 2f will be connected to the exhaust, and the motor will operate in the opposite direction; and, as explained above, the speed of the motor will be proportional to the movement of the valve 13. It will be noted that the pressure regulating valve will now be actuated in accordance with the pressure in the chamber between the plungers 23 and 24 so that the pressure drop across the valve will be again 100 pounds per square inch.

Figure 1:
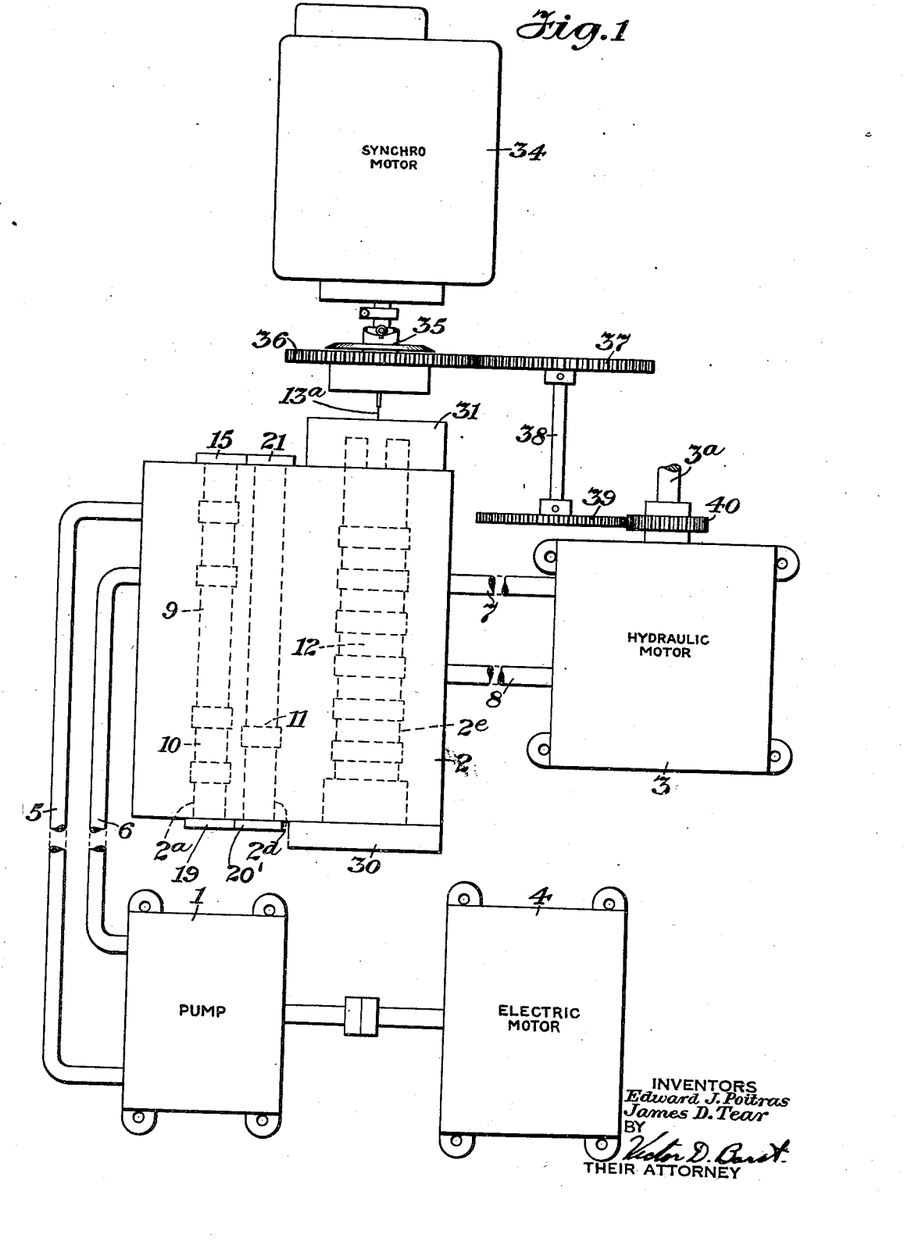
Fig. 1 is a diagrammatic illustration of the complete system.

If it is desired to operate the motor in synchronism with another movable object, as in the system illustrated in Figure 1, wherein the motor is operated in synchronism with a Selsyn receiver 34, the valve rod 13a is actuated in accordance with the difference in movement between the Selsyn receiver, and the hydraulic motor 3. The Selsyn receiver of course follows the movements of a transmitter which may be located at any remote point. The Selsyn receiver is connected to a differential 35 similar in all respects to the differential illustrated in our copending application Serial No. 15,758, filed April 11, 1935. The Selsyn motor operates one side of this differential. The other side is operated through a gear 36 which meshes with a gear 37 secured on a shaft 38. Another gear 39 also mounted on the shaft 38 for rotation therewith meshes with a pinion 40 mounted upon the shaft 3a of the hydraulic motor from which shaft an object may be driven. The differential 35 is such that the difference in movement between the receiver motor and the hydraulic motor is reproduced as longitudinal movement of the valve rod 13a. The gear train described and connecting the differential to the hydraulic motor may be such that an object driven by the hydraulic motor operates in a one to one ratio with respect to the transmitter which is connected to the receiver 34.

In the above method of operation, with the system so far described, the hydraulic motor must necessarily lag behind the Selsyn receiver since the operation of the valve rod 13a is dependent upon a difference in position or movement of these elements. To eliminate this positional difference and secure a synchronous relation there is provided the advancing or synchronous valve 14. This advancing or synchronous valve is a needle valve having a long stem 14a. The stem 14a is made long in order that the expansion and contraction will compensate for changes in the temperature of the oil. The valve stem 14a has formed on the end thereof a threaded section 14b which is received in a threaded recess in the valve block. By means of this threaded end section 14b, the needle valve 14 may be adjusted with respect to its valve seat. The stem 14a extends along a passage or bore 2h in the control block. The passage 2h connects the valve 14 and a passage 14c which extends between the passage 2h and an annular chamber 31b formed by reducing the diameter of the cap extension 31a. The valve 14 controls the rate of flow of oil between the bore 2h and the chamber 33. The direction of the flow of oil through the valve 14 is controlled by the valve 12 which is provided with a slot 12' adjacent its upper end and positioned to cooperate with the chamber 31b and the chamber 32, and a slot 12j positioned to cooperate with the chamber 31b and the exhaust port 27a. In the position shown, it will be observed that the valve 12 laps the chamber 31b. However, if the valve 12 is moved downwardly, the chamber 31b is placed into communication through the slot 12' in the valve with the chamber 32 and oil at a low pressure flows from the chamber 32 to the chamber 31b, and through the passages 14c and 2h, the valve 14 and passage 14d to the chamber 33. This oil causes the valve sleeve 27 to move upwardly, that is, in a direction opposite to the direction of movement of the valve 12. On the other hand, if the valve 12 is moved upwardly, the chamber 31b and consequently the chamber 33 through the valve 14 is placed into communication through the slot 12j with the exhaust port so that oil is exhausted from the chamber 33 and the pressure on the upper end of the valve which extends into the chamber 32 causes the valve sleeve 27 to move downwardly, again opposite to the valve 12.

It will be observed that this action of the sleeve 27 due to these ports and passages is additive with respect to the movement of the valve 12. The ultimate effect is that the motor ports are gradually opened a greater amount than they would otherwise be by the difference in movement between the Selsyn receiver and the hydraulic motor. Consequently, the motor speed is increased and the object driven thereby is brought into synchronism with the movable object which is operating the Selsyn receiver. Likewise, when the Selsyn receiver comes to rest this additive factor brings the object driven by the hydraulic motor into positional agreement with the object effecting the operation of the Selsyn receiver.

The arrangement of the valve 12 within the sleeve 27 is for the purpose of obtaining a large movement within a limited space. There are provided, however, certain arrangements for limiting the relative movement between the sleeve 27 and the valve 12 to one unit of movement in either direction from the relation illustrated in Figure 2. For this purpose, there is provided a passage 27g. When the valve 12 moves downwardly with respect to the valve sleeve 27 one unit of movement, one end of the passage 27g is placed into communication with the exhaust port 27e; the other end of the passage is in communication with the chamber 33 and pressure in the chamber 33 is thus relieved. When the valve 12 moves upwardly, one unit of movement with respect to the sleeve 27, the passage 27g is placed into communication with the low pressure port 27f. Thus, after one unit of relative movement the valve 12 and the sleeve 27 move together. To ensure this condition mechanical means are also provided for capturing the valve 12. For example, if the valve 12 moves upwardly with respect to the valve sleeve 27 one unit of movement, the shoulder formed by the reduced portion 12a of the valve 12 will abut against an annular end piece 41 secured to the upper end of the valve sleeve 27. If on the other hand the valve 12 moves downwardly with respect to the valve sleeve 27 one unit of movement a lug 42 formed on the end of the valve 12 will abut against the plate 28.

In the controller illustrated in Figure 2, control of the rate of flow of liquid through the motor is effected by maintaining a constant drop in pressure across a valve through which the high pressure side of the motor communicates with the supply of liquid under pressure. However, the same control may be effected by maintaining a constant drop in pressure across a valve through which the low pressure side of the motor communicates with an exhaust passage. In this latter arrangement, the pressure in the exhaust passage is constant and the back pressure on the motor may be maintained constant by regulating the pressure of the supply in accordance with the back pressure on the motor. If the back pressure on the motor is maintained constant in this way, and as stated the pressure in the exhaust passage is constant, the drop in pressure across a valve controlling communication between the low pressure side of the motor and the exhaust will be constant. The rate of flow of liquid from the motor, and consequently, the rate of flow of liquid through the motor will, therefore, be proportional to the valve opening.

Figures 3, 4:
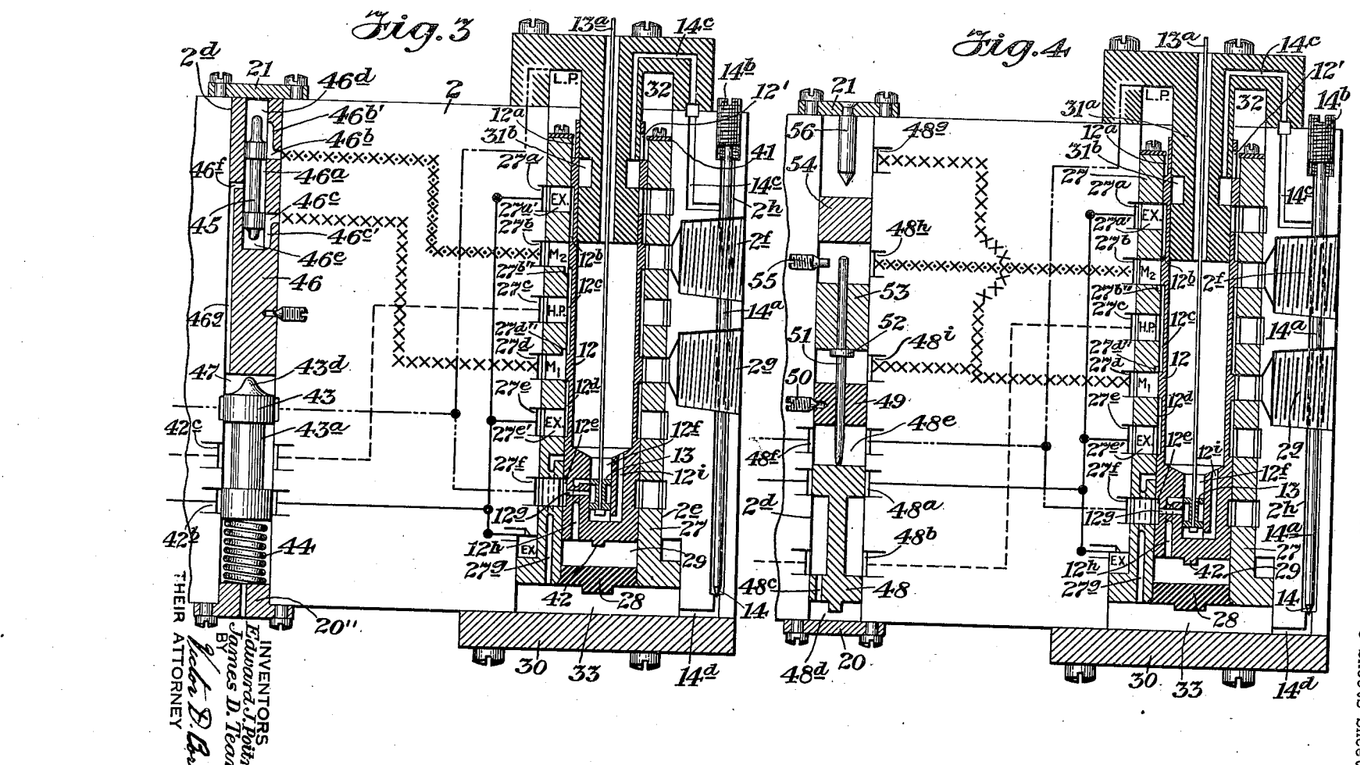
Fig. 3 illustrates a modified regulating valve for a modified system.
Fig. 4 illustrates another form of regulating valve.

In certain installations, it is preferable to control the motor by controlling the rate of flow of liquid from the motor and a controller for this purpose is illustrated in part in Figure 3. The difference between this and the controller illustrated in Figure 2 is the pressure regulating valve and the arrangement for operating this valve. The valve 11 is replaced by a valve 43. The overflow valve 9, the low pressure valve 10, the control valve 12, pilot valve 13 and advancing valve 14 are the same in this modified form of controller as they are in the form shown in Figure 2. The only differences reside in the valve 43, the ports cooperating therewith, the arrangement for selecting, between two pressures the pressure to act on the valve and the provisions of grooved extensions 27b'' and 27d'' on the ports 27b and 27d, the purpose of which will hereinafter appear.

The regulating valve 43 is a balanced piston valve having a reduced central portion 43a and it is mounted in the bore 2d in the control block. Cooperating with the valve there are an exhaust port 42b and a high pressure port 42c, the ports 42b and 42c being spaced apart longitudinally of the bore 2d. Acting between the plate 20'' covering the lower end of the bore 2d and the adjacent end of the valve, there is a spring 44 which exerts a force on the valve equivalent to a pressure of one hundred pounds per square inch; the low pressure oil supply might be used in place of this spring. The force of the spring 44 tends to move the valve to cut off the exhaust port 42b and maintain the high pressure port open.

Opposed to the force of the spring 44, there is the back pressure of the motor and for the purpose of applying this pressure to the valve 43 the selective valve 45 is provided. The valve 45 is a piston valve and it is slidably mounted in a longitudinal bore 46a in a block 46. The block 46 has two ports 46b and 46c which are connected as shown to the motor ports and passages 27b and 27d. The ports 46b and 46c are spaced apart longitudinally of the valve and include grooved extensions 46b' and 46c' which extend longitudinally of the valve in opposite directions so that the port 46b is never cut off from communication with a chamber 46d formed between the plate 21 and the adjacent end of the valve and the port 46c is never cut off from communication with the chamber 46e formed between the inner end of the bore 46a and the adjacent end of the valve. The valve 45 selectively controls communication between the ports 46b and 46c and a transverse passage 46f which, through a longitudinal groove 46g in the surface of the block 46, communicates with a chamber 47 formed between the inner or lower end of the block 46 and the adjacent end of the valve 43. A projection 43d on the end of the valve 43 limits the movement of the valve in the direction of the block 46.

With the above described arrangement, the pressure of the oil in the port 42c is regulated by the difference in the force exerted by the spring 44 and the back pressure on the motor; the valve 45 selects the oil of lower pressure in the ports 46b and 46c to be delivered to the passage 46f. In the position in which the valve 12 is illustrated in Figure 3, oil under pressure trickles through the extensions 27b'' and 27d'' of the ports 27b and 27d. This oil acts on both sides of the piston valve 45 and the valve 45 remains in the position in which it is illustrated in Figure 3. In this position of the valve 12, the motor is of course inoperative. Let us now assume the valve 12 is moved upwardly, in the manner heretofore explained, so that it is off lap with respect to the ports 27b and 27d. Under these assumed conditions, the port 27b is connected to the high pressure port 27c and the port 27d is connected to the exhaust port 27e. Oil under high pressure then enters the motor passage 2f and the port 46b. The pressure in the port 46c is, of course, reduced as this port is connected to the low pressure side of the motor; the motor passage 2g. The pressure acting in the chamber 46d, therefore, predominates, forces the valve 45 down and the port 46c is placed in communication with the passage 46f and chamber 47. Likewise, if the valve 12 is moved downwardly off lap with respect to the ports 27b and 27d, the port 27b will be placed into communication with the low pressure side of the motor and the port 27d with the high pressure; the pressure in the chamber 46e will then predominate and the port 46b will be placed into communication with the passage 46f and chamber 47.

As the valve 12 is moved off lap, the oil flowing through this valve from the low pressure side of the motor to the exhaust is throttled. A certain back pressure in the motor is, therefore, built up in the passage communicating with the low pressure side of the motor. The value of this back pressure is a function of the pressure of the oil supply and it may therefore be varied, or as desired here, it may be maintained constant by controlling the pressure of the oil supply. In the arrangement illustrated in Figure 3, this back pressure is maintained constant at one hundred pounds per square inch. If the back pressure exceeds this value in the chamber 47 it will move the valve 43 against the action of the spring 44 to place the exhaust port 42b into communication with the high pressure port 42c and thus effect a reduction in the pressure of the oil supplied to the motor. As a matter of fact, during operation, the valve 43 is regulating the extent of the communication between the ports 42b and 42c and the oil pressure in the passages communicating with the low pressure side of the motor is maintained at one hundred pounds per square inch irrespective of the load on the motor or the valve opening.

By thus controlling the back pressure on the motor or the pressure at the low pressure side of the motor, a constant pressure drop is maintained across the port of the valve controlling communication between the low pressure side of the motor and the exhaust. The rate of flow of oil through the valve is, therefore, proportional to the extent the valve is opened. Consequently, the rate of flow of oil through the motor and, therefore, the speed of the motor are proportional to the opening of the valve.

The velocity of the motor may also be controlled by adjusting the pressure of the supply in accordance with the difference in the pressure in the motor leads, that is, the drop in pressure across the motor. The pressure regulating valve and mechanism for actuating the valve illustrated in Figure 4 are adapted to regulate the pressure of the supply in this way. In Figure 4, the pressure regulating valve 48 is of the balanced piston valve type similar to the regulating valve shown in the modification illustrated in Figure 2. The valve 48 may be, as it is illustrated, slidably mounted in the bore 2d of the control block 2 adjacent the plate 20. The valve coperates with longitudinally spaced, circumferential exhaust and pressure ports 48a and 48b respectively. Through the lower end of the valve there is a passage 48c which places a chamber 48d formed between the end of the valve and the plate 20 in communication with the chamber formed by the reduced portion of the valve. Oil under pressure entering through the pressure port 48b enters the chamber 48d through the passage 48c and acts upon the end of the valve tending to move the valve upwardly from the position shown in Figure 4. As the valve moves upwardly from the position shown, the exhaust port is opened to the pressure supply and thus reduces the pressure of the oil in the pressure port 48b.

Movement of the valve under the action of the oil in the chamber 48d is resisted by the force exerted by the low pressure oil and the difference between the forces exerted by the pressure of the oil in the motor passages, in other words, a force that is proportional to the drop in pressure across the motor. The low pressure oil acts upon the upper end of the valve 48 in a chamber 48e to which the low pressure oil is admitted through a port 48f. The chamber 48e is formed between the end of the valve 48 and the end of a block 49 which is secured in the bore 2d against movement therein by a set screw 50. Extending through and slidable in a longitudinal bore in the block 49, there is a rod 51 having a collar 52 formed thereon above the upper end of the block 49. The section of the rod above the collar 52 extends through a longitudinal bore in a solid plunger 53 which normally abuts against the collar 52. Another plunger 54 is mounted in the bore 2d above the plunger 53. A set screw 55 extends into the bore 2d between the plungers 53 and 54 and forms a limit stop for the upward movement of the plunger 53. A pin 56 secured to the plate 21 forms a similar limit stop for upward movement of the plunger 54. In the position in which the valve 48 is shown in Figure 4, that is, with the exhaust port closed, the upper end of the rod 51 extends slightly beyond the limit stop 55, when the opposite end is abutting against the valve 48. Three ports 48g, 48h and 48i communicate with the bore 2d for the purpose of supplying oil for the actuation of the plungers 53 and 54. The port 48g communicates with the bore 2d above the plunger 54, the port 48h communicates with the bore 2d between the plungers 53 and 54, and the port 48i communicates with the bore 2d between the upper end of the block 49 and the lower end of the plunger 53. The ports 48g and 48i are connected together and to the motor port 27d of the valve sleeve 27, and the port 48h is connected to the motor port 27b of the valve sleeve 27.

With the arrangement described above, the force exerted through the rod 51 and the valve 48 represents a force which is the difference between the force exerted by the oil in the motor leads, and which is proportional to a force exerted by oil under a pressure equivalent to the drop in pressure across the motor. This force is added to the force exerted by the low pressure oil so that the pressure of the oil supply to the motor may be represented by the following equation (disregarding the slight difference in areas of the ends of the plunger 53 due to the area of the rod 51):

$$P-(M_1-M_2)=L$$

where P represents the pressure of the oil supply, and $(M_1-M_2)$ represents the drop in pressure across the motor, that is, the difference between the pressures in the motor passages; and the L represents the pressure of the low pressure oil. The arrangement illustrated and described operates to effect this result as follows: If the valve 12 is actuated so that the port 27d is connected to the oil supply and the port 27b is connected to the exhaust, oil under pressure, that is, the pressure of the oil in the motor passage which communicates with the port 27d will be admitted to the port 48i between the upper end of the block 49 and the lower end of the plunger 53 and also to the port 48g above the plunger 54. The space between the plungers 53 and 54 will be connected to the low pressure side of the motor, i. e. the motor port 27b. The plunger 53 will thus be moved upwardly against the stop 55. The plunger 54 will be moved downwardly against the end of the rod 51. This occurs because the pressure of the oil below the plunger 53 and above the plunger 54 is greater than the pressure of the oil between the plungers. The plunger 53 will thus have no effect upon the valve as it will not exert any force upon the rod 51. The plunger 54 will however exert a force upon the rod 51 which force will be proportional to the difference between the pressure admitted between the plungers 53 and 54, that is, the pressure of the oil at the low pressure side of the motor and the pressure of the oil admitted above the plunger 54, that is, the pressure of the oil at the high pressure side of the motor. The force therefore exerted upon the rod 51 will be proportional to the drop in pressure across the motor and this force will, through the rod 51, be added to the force exerted by the low pressure oil so that the pressure of the oil in the pressure port 48b will be one hundred pounds per square inch greater than the force exerted through the rod 51.

If on the other hand, the valve 12 is so moved that the port 27b and the motor passage communicating therewith is connected to the high pressure oil and the port 27d and the motor passage connected therewith is connected to the exhaust, oil from the passage on the high pressure side of the motor will be admitted between the plungers 53 and 54 and oil at the pressure of the low pressure side of the motor will be admitted above and below the plungers 53 and 54. With this condition existing, the plunger 54 will be moved against its limit stop 56, the plunger 53 will be moved against the collar 52 on the rod 51 and through this collar will exert a force upon the valve 48. The force exerted by the oil between the plungers will, however, be resisted by the force exerted by the oil below the plunger 53 which is the pressure of the oil on the low pressure side of the motor. There is thus exerted upon the rod 53 a force which is proportional to the pressure drop across the motor as represented by the formula given above.

By thus controlling the pressure of the oil supplied to the motor in accordance with the pressure drop across the motor, there is maintained a constant pressure drop across the valve controlling the supply of oil to the motor and the passage of oil from the motor to the exhaust. This arrangement gives a more delicate control of the velocity of the motor and as in the embodiments illustrated in Figures 2 and 3, the velocity of the motor will be proportional to the movement of the valve rod 13a.

It is obvious that various changes may be made by those skilled in the art in the details of the embodiments of the invention illustrated in the drawings and described above within the principle and scope of the invention as expressed in the appended claims.

We claim:

1. In a hydraulic power system including a hydraulic medium under different and varying pressures, pressure control means for affecting the system and operating means therefor including means for selectively applying to the control means the force exerted by the portion of the hydraulic medium under the highest pressure.

2. In a hydraulic power system including several passages containing a hydraulic medium under different and varying pressures, pressure control means for affecting the system and operating means therefor connected to the several passages, the operating means including means for selectively applying to the control means the force exerted by the hydraulic supply thereto under the highest pressure.

3. In a hydraulic power system including several passages containing a hydraulic medium under different and varying pressures, a pressure-regulating valve and means for effecting the operation of the valve including means for exerting a force to actuate the valve in one direction, and means for exerting a force on the valve in the opposite direction including means for selectively applying the force exerted by the highest of several pressures to the valve, and connections between the several passages and said last mentioned means.

4. In a hydraulic power system including several passages containing a hydraulic medium under different and varying pressures, a pressure-regulating valve and means for effecting movement of the valve including a connection between the valve and one of said passages to apply the force of the hydraulic medium to effect movement of the valve in one direction and means for exerting a force on the valve in the opposite direction including means for selectively applying the force exerted by the highest of several pressures to the valve, and connections between the remainder of the several passages and said last mentioned means.

5. In a hydraulic power system, a source of liquid of substantially constant displacement, a hydraulic motor connected thereto and a controller intermediate the supply of liquid under pressure and the motor; the controller including a four-way control valve and means for maintaining a constant pressure drop across the valve comprising a pressure regulating valve for regulating the pressure in advance of said control valve and operating means for the pressure regulating valve including means acting upon the valve to open the valve in accordance with the pressure on the supply side of the control valve, and means opposing the opening of the valve in accordance with the sum of a constant pressure and the highest of the two pressures at the motor.

6. A controller for a hydraulic motor comprising a four-way control valve and means for maintaining a constant pressure across the control valve including a pressure regulating valve, a connection for connecting the supply end of the control valve to move the pressure regulating valve in one direction, means for exerting a constant force on the valve to move the valve in the opposite direction, and means for selectively adding to the constant force the force exerted by the hydraulic medium of highest pressure at the motor.

7. In a hydraulic power system, a source of liquid of substantially constant displacement, a controller connected thereto for controlling the flow of liquid and including passages containing hydraulic medium under different and varying pressures, a control valve within the controller, connections for applying the pressure of the supply of liquid in a direction to open the valve, means for applying a constant pressure to effect the operation of the valve in the opposite direction, and means for selecting the pressure of the hydraulic medium in one of the several passages in accordance with the relative values of the pressures in the passages and adding the force thereof to the constant force acting on the valve.

8. In a hydraulic power system, a source of liquid of substantially constant displacement, a hydraulic motor connected thereto and a controller for controlling the hydraulic motor including a pressure-actuated control valve intermediate the source of liquid and the motor, connections for applying the pressure of the source of liquid to effect the opening of the control valve, means for applying a constant pressure to effect operation of the valve in the opposite direction and means for selecting the pressure of the hydraulic medium in one of the motor leads in accordance with the relative values of the pressures in the motor leads and adding the selected pressure to the constant pressure acting on the control valve.

9. In a hydraulic power system, a source of liquid of substantially constant displacement, a hydraulic motor connected thereto and a controller for controlling the hydraulic motor including a throttle valve, a pressure-actuated control valve intermediate the source of liquid and the motor, connections for applying the pressure of the source of liquid to effect the opening of the control valve, means for applying a constant pressure to effect operation of the valve in the opposite direction and means for selecting the pressure of the hydraulic medium in one of the motor leads in accordance with the relative values of the pressures in the motor leads and adding the selected pressure to the constant pressure acting on the control valve.

10. In a hydraulic power system including several passages containing therein hydraulic medium under different and varying pressures, means operative to vary the flow of hydraulic medium in certain of said passages including means for varying the cross-sectional area of the said certain passages and for changing the direction of flow of the hydraulic medium therein, and means for regulating the pressure drop across the variable cross-sectional area of one of said certain passages.

11. In a hydraulic power system including several passages containing therein hydraulic medium under different and varying pressures, means operative to vary the flow of hydraulic medium in certain of said passages including means for varying the cross-sectional area of the said certain passages and for changing the direction of flow of the hydraulic medium therein, and means for maintaining the flow of hydraulic medium through one of said regulated passages constant for any given cross-sectional area thereof.

12. In a hydraulic power system including several passages containing therein hydraulic medium under different and varying pressures, means operative to vary the flow of hydraulic medium in certain of said passages including means for varying the cross-sectional area of the said certain passages and means for changing the direction of flow of the hydraulic medium therein, and means for maintaining the pressure drop across the variable cross-sectional area of one of said passages constant.

13. In a hydraulic power system including several passages containing therein hydraulic medium under different and varying pressures, means operative to vary the flow of hydraulic medium in certain of said passages including means for varying the cross-sectional area of the said certain passages and for changing the direction of flow of the hydraulic medium therein, and means for maintaining the flow of hydraulic medium through one of said regulated passages constant for any given cross-sectional area thereof including a pressure regulating valve, and means for selectively applying thereto a force in accordance with the relative value of the pressure of the hydraulic medium in certain of said passages.

14. In a hydraulic power system including several passages containing therein hydraulic medium under different and varying pressures, means operative to vary the flow of hydraulic medium in certain of said passages including means for varying the cross-sectional area of the said certain passages and for changing the direction of flow of the hydraulic medium therein, and means for maintaining the flow of hydraulic medium through one of said regulated passages constant for any given cross-sectional area thereof including a pressure regulating valve, means for applying a force of constant magnitude thereto, and for selectively applying to the valve in addition to said force of constant magnitude a force in accordance with the relative value of the pressures of the hydraulic medium in certain of said passages.

15. In a hydraulic power system including several passages containing therein hydraulic medium under different and varying pressures, means operative to vary the flow of hydraulic medium in certain of said passages including means for varying the cross-sectional area of the said certain passages and for changing the direction of flow of the hydraulic medium therein, and means for maintaining the flow of hydraulic medium through one of said regulated passages constant for any given cross-sectional area thereof including a pressure regulating valve, connections for applying the pressure of the hydraulic medium in one of said passages to move the valve in one direction, means for applying a force of constant magnitude to effect moving of the valve in the opposite direction, and means for selectively adding to said force of constant magnitude, a force in accordance with the relative value of the pressures of the hydraulic medium in certain of said passages.

16. In a hydraulic power system including several passages containing therein hydraulic medium under different and variable pressures, means operative to vary the flow of hydraulic medium in certain of said passages including means for varying the cross-sectional area of said certain passages and for changing the direction of flow of the hydraulic medium therein, and means for maintaining the flow of hydraulic medium through one of said regulated passages constant for any given cross-sectional area thereof including a pressure regulating valve, connections for applying the pressure of the hydraulic medium in one of said passages to move the valve in one direction, means for applying a force of constant magnitude to move the valve in the opposite direction, and means for selectively adding to said force of constant magnitude, a force in accordance with the greater pressure of the pressures in two of said passages.

17. In a hydraulic power system, a source of hydraulic medium under pressure, a hydraulic motor connected thereto, and a controller for controlling the hydraulic motor including a control valve for controlling the cross-sectional area of the opening of the passage to the motor and the direction of flow of the hydraulic medium, a pressure regulating valve for maintaining the flow of hydraulic medium to the motor constant for any opening of said control valve, and means for actuating said pressure regulating valve including a connection for applying the pressure of the hydraulic medium supplied to the motor to move the valve in one direction, means for applying a force of constant magnitude to move the valve in the opposite direction and means for selectively adding to said force of constant magnitude a force in accordance with the relative values of the pressures of the hydraulic medium in the motor leads.

18. In a hydraulic power system, a source of hydraulic medium under pressure, a hydraulic motor connected thereto, and a controller for controlling the hydraulic motor including a control valve for controlling the cross-sectional area of the opening of the passage to the motor and the direction of flow of the hydraulic medium, a pressure regulating valve for maintaining the flow of hydraulic medium to the motor constant for any opening of said control valve, and means for actuating said pressure regulating valve including a connection for applying the pressure of the hydraulic medium supplied to the motor to move the valve in one direction, means for applying a force of constant magnitude to move the valve in the opposite direction and means for selectively adding to said force of constant magnitude a force in accordance with the higher of the pressures of the hydraulic medium in the motor leads.

19. In a hydraulic power system, a source of hydraulic medium under pressure, a hydraulic motor connected thereto, and a controller for controlling the hydraulic motor intermediate the source of hydraulic medium and the motor, the controller comprising a four-way control valve for controlling the cross-sectional area of the passages leading to the motor and the direction of flow of hydraulic medium through the passages, a pressure regulating valve for maintaining the pressure drop across the four-way valve constant, and means for actuating the four-way valve including a connection for applying the pressure of the hydraulic medium delivered to the four-way valve to the pressure regulating valve to effect movement thereof in one direction, means for applying a force of constant magnitude to effect movement of the pressure regulating valve in the opposite direction, and means for selectively adding to the force of constant magnitude a force in accordance with the relative values of the pressures of the hydraulic medium in the motor leads.

20. In a hydraulic power system, a source of hydraulic medium under pressure, a hydraulic motor connected thereto, and a controller for controlling the hydraulic motor intermediate the source of hydraulic medium and the motor, the controller comprising a four-way control valve for controlling the cross-sectional area of the passages leading to the motor and the direction of flow of hydraulic medium through the passages, a pressure regulating valve for maintaining the pressure drop across the four-way valve constant, and means for actuating the four-way valve including a connection for applying the pressure of the hydraulic medium delivered to the four-way valve to the pressure regulating valve to effect movement thereof in one direction, means for applying a force of constant magnitude to effect movement of the pressure regulating valve in the opposite direction, and means for selectively adding to the force of constant magnitude a force in accordance with the higher of the pressures of the hydraulic medium in the motor leads.

21. A controller for a hydraulic motor comprising a control valve for controlling the cross-sectional area of the openings of passages to the motor and the direction of flow of hydraulic medium in said passages to the motor, and a pressure regulating valve for regulating the pressure of the hydraulic medium on the supply side of said control valve, and means for operating said pressure regulating valve including a connection for applying the pressure of the hydraulic medium on the supply side of said control valve to one end of the pressure regulating valve, means for applying a force of constant magnitude to the other end of the valve and means for selectively adding to the force of constant magnitude a force in accordance with the relative values of the pressure of the hydraulic medium in the passages connected to the motor.

22. A controller for a hydraulic motor comprising a control valve for controlling the cross-sectional area of the openings of passages to the motor and the direction of flow of hydraulic medium in said passages to the motor, and a pressure regulating valve for regulating the pressure of the hydraulic medium on the supply side of said control valve, and means for operating said pressure regulating valve including a connection for applying the pressure of the hydraulic medium on the supply side of said control valve to one end of the pressure regulating valve, means for applying a force of constant magnitude to the other end of the valve and means for selectively adding to the force of constant magnitude a force in accordance with the higher of the pressures of the hydraulic medium in the passages connected to the motor.

EDWARD J. POITRAS.
JAMES D. TEAR.

REFERENCES CITED

The following references are of record in the file of this patent:

UNITED STATES PATENTS

| Number | Name | Date |
| --- | --- | --- |
| 1,939,113 | Ferris | Dec. 12, 1933 |
| 2,004,522 | Douglas | June 11, 1935 |
| 1,972,462 | Schafer | Sept. 4, 1934 |
| 2,005,732 | Ernst et al. | June 25, 1935 |
| 2,005,731 | Ernst | June 25, 1935 |
| 2,006,311 | Ernst | June 25, 1935 |
| 2,028,766 | Ernst | Jan. 28, 1936 |
| 1,964,196 | Cuttat | June 26, 1934 |
| 1,467,522 | Amsler | Sept. 11, 1923 |
| 1,964,398 | Ferris | June 26, 1934 |
| 2,111,964 | Crane | Mar. 22, 1938 |